Jan. 31, 1961    L. W. BREHM    2,969,730
DATA TRANSLATION AND PRINTING
Filed Dec. 31, 1959    9 Sheets-Sheet 1

INVENTOR
LYLE W. BREHM

BY

AGENT

Jan. 31, 1961 　　　L. W. BREHM 　　　2,969,730
DATA TRANSLATION AND PRINTING
Filed Dec. 31, 1959 　　　　　　　　　　　　　9 Sheets-Sheet 3

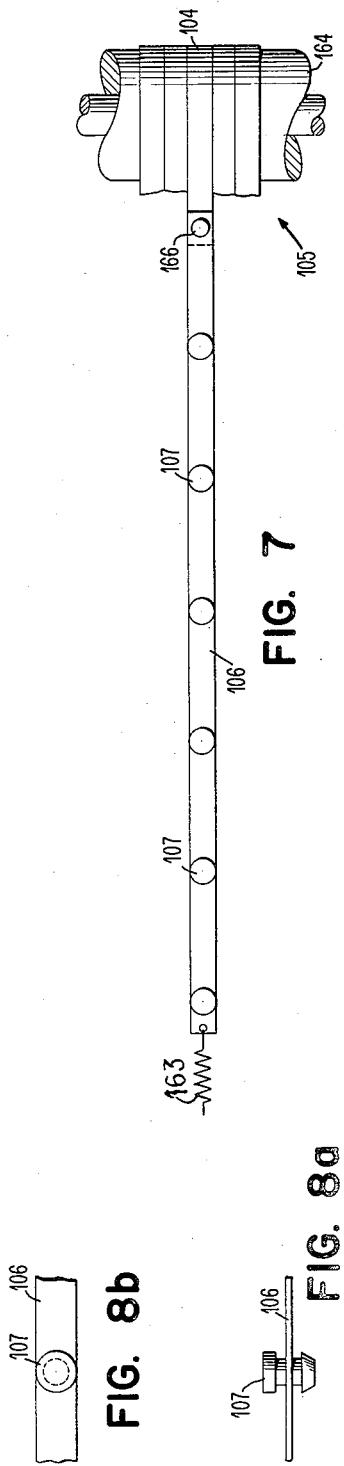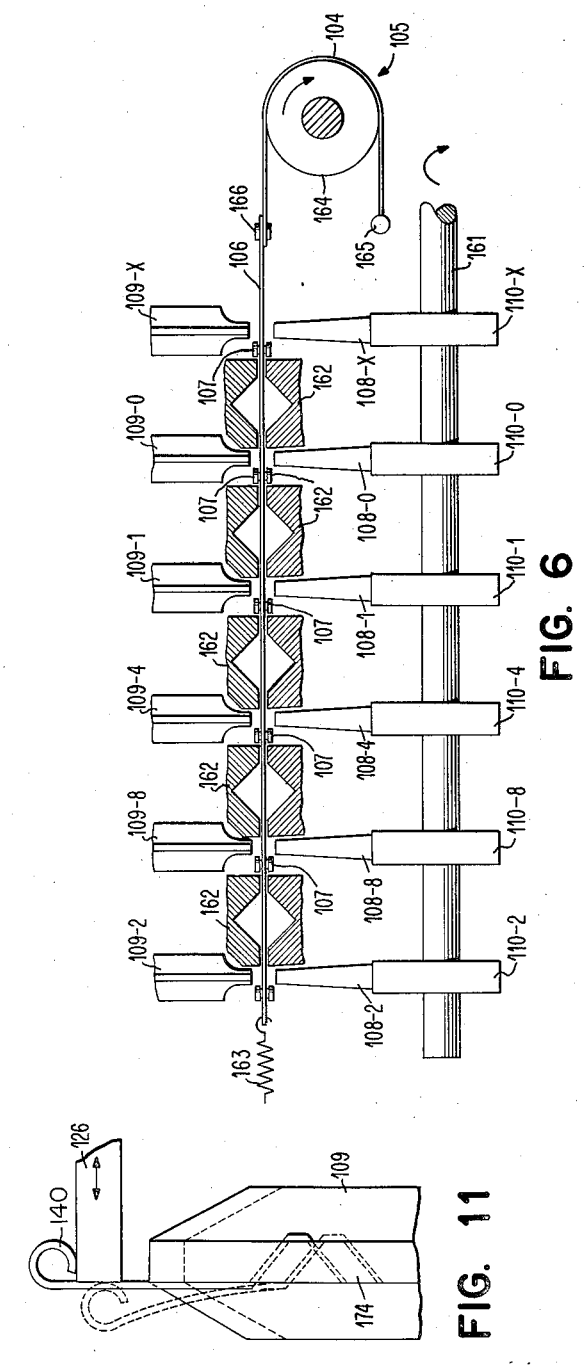

Jan. 31, 1961   L. W. BREHM   2,969,730
DATA TRANSLATION AND PRINTING
Filed Dec. 31, 1959   9 Sheets-Sheet 6
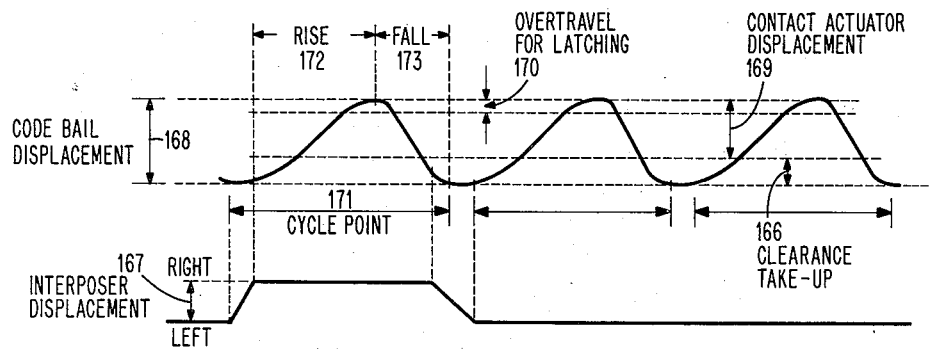
FIG. 9
FIG. 10a
| | 12 | 11 | 0 | N |
|---|---|---|---|---|
| 1 | A | J | / | 1 |
| 2 | B | K | S | 2 |
| 3 | C | L | T | 3 |
| 4 | D | M | U | 4 |
| 5 | E | N | V | 5 |
| 6 | F | O | W | 6 |
| 7 | G | P | X | 7 |
| 8 | H | Q | Y | 8 |
| 9 | I | R | Z | 9 |
| 0 | & | – | | 0 |
| 8-3 | . | $ | , | # |
| 8-4 | ◇ | ✶ | % | @ |
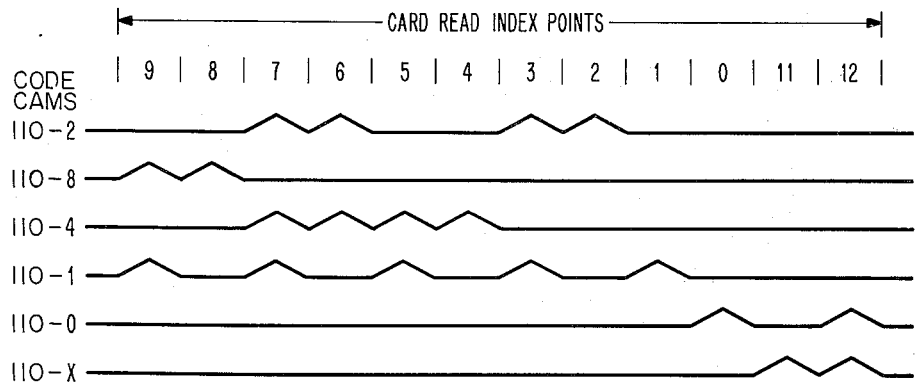
FIG. 10b

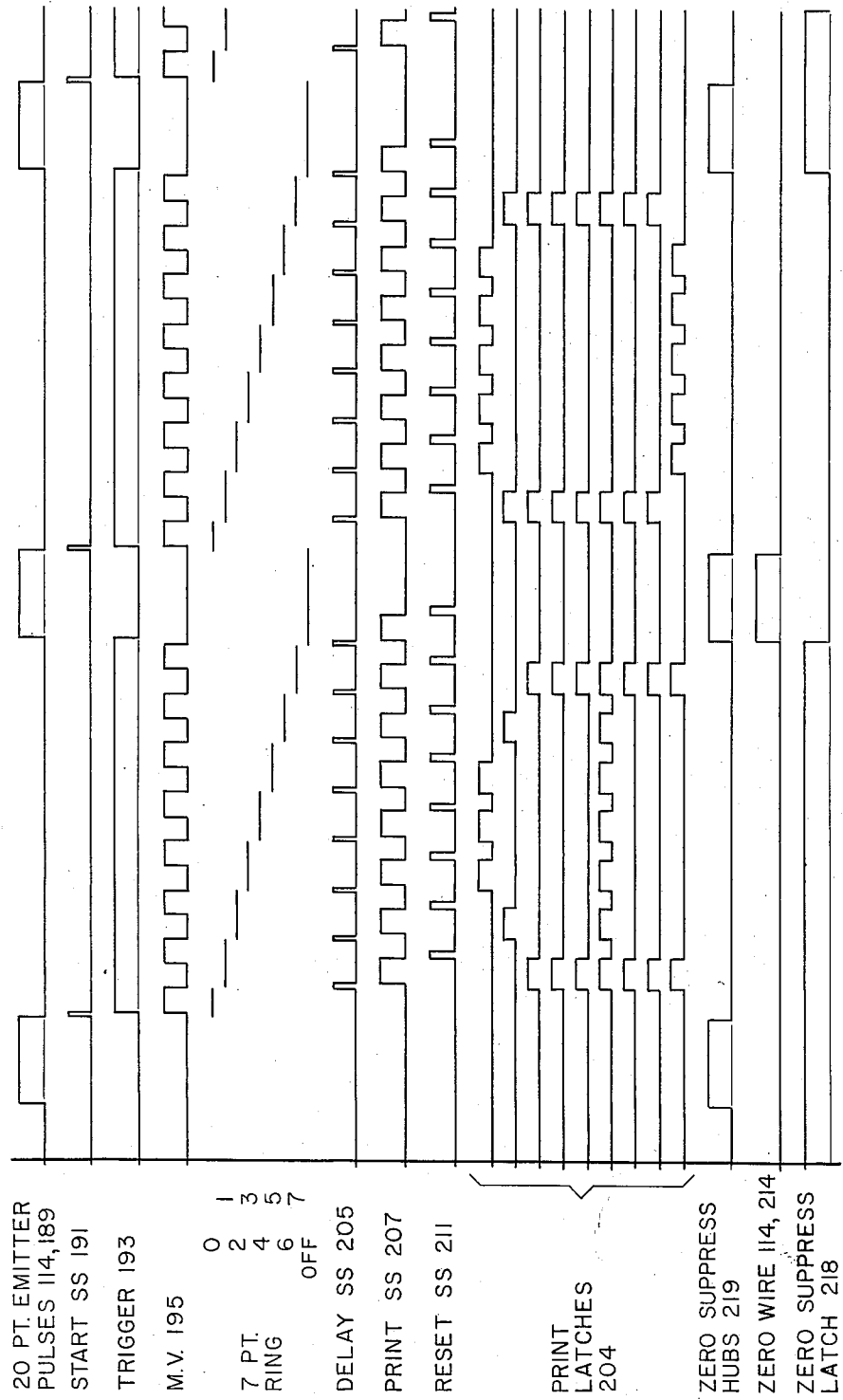

United States Patent Office 2,969,730
Patented Jan. 31, 1961

2,969,730

DATA TRANSLATION AND PRINTING

Lyle W. Brehm, Endicott, N.Y., assignor to International Business Machines Corporation, New York, N.Y., a corporation of New York Filed Dec. 31, 1959, Ser. No. 863,212

8 Claims. (Cl. 101—93)

This invention relates to the improved translation of data in data processing. More particularly, but not exclusively, this invention relates to the translation and printing of data in data processing and computing machines.

In data processing and computing machines, it is frequently necessary to receive data, store the data for brief periods, convert the data into codes of different form, to perform statistical operations, and to alternatively issue either machine-readable or human-readable manifestations of the data. Examples of code conversion requirements may be found in converting from magnetic or paper tape codes to data processing record card codes, and vice versa; converting from any of the last recited codes to codes which are particularly developed to operate electrical or mechanical mechanisms having specific code characteristics; and for converting from any given code into codes which are manifested in spatial relationships similar in appearance to printable characters. One particular example of such a code conversion is found in a printing machine which reads a data processing record card of the well-known IBM type having twelve rows of index point positions each extending through eighty data columns of the card, and converts this code into character codes which have one bit for each printable character. An example of storing information for brief periods of time in order to accommodate time requirements of different functional operations in the machine is reading a well-known IBM card row by row, each column being sensed simultaneously with every other column. It is necessary that all twelve index point positions be read before the significance of the data stored in each column of the card can be known; therefore, the data in index point positions read early in a cycle have to be stored for some length of time until the index point appearing at the end of the cycle can be read. Additionally, there may be another storage period necessary to allow subsequent data receiving means to finish performing a function in response to a previously-read record card.

When both the storage and code converting operations have to be performed on the same data in the same general time period, cost and space economics indicate that a device which can perform both of these functions concurrently is highly desirable. Devices found in the prior art such as relay combinations, triggers, diode logic, magnetic cores and other passive bistable devices, and various forms of mechanical devices, are known to possess the possibility of storage and code conversion. However, as is well known to those skilled in the art, magnetic cores and other passive bistable devices require driving amplifiers, sensing amplifiers, timing rings and logical gates; diode logic circuits are incapable of storing data; mechanical devices are generally slow in speed, require excessive maintenance, and have a faster depreciation rate than electrical means; and when a large number of data bits are involved, relay combinations become cumbersome and expensive. However, it is also well known that mass produced mechanical means of suitable design can be made more cheaply, and when performing dual functions such as code conversion and storage, can be made to take up less space in a machine than, for instance, a plurality of relay banks, or a combination of diode logic and core storage. When any of the aforementioned devices are being considered for use in a data processing or computing machine, the various advantages and disadvantages thereof compete directly with one another; it has heretofore been necessary to determine the chief characteristic required, and to subjugate all other characteristics in the interest of obtaining this chief objective. In the data processing industry, the need for medium speed, low cost data processing machines has recently achieved a new importance. Offices with limited machine needs are finding that increased labor costs have made the practical application of low cost data processing machines possible. The ability to serve this new field of users is directly dependent on the extent to which low cost, reliable machines can be supplied.

It is therefore a primary object of this invention to provide a combination storage and code converting device of medium speed, which is relatively inexpensive to manufacture, easy to maintain, and which requires a minimum of space.

Among other objects of the invention are the following:

To provide a data translation device having the cost and space characteristics of mechanical devices while achieving a measure of the simplicity, reliability, easy maintenance, and speed possibilities of electrical and electromagnetic devices;

To provide a data translating device suitable for converting from a relatively few code bits into a large number of individual output bits, and yet requiring a minimum of mechanism and adjunctive devices therefor;

To provide a data translating device with improved mechanical speed characteristics;

To provide a data translating device of a mechanical design having suitable speed characteristics for operating high speed wire print elements;

To provide such a device having a simple design, with the inherent reliability and ease of maintenance attendant thereto;

To provide a reliable data translating device in which the critical parts may be produced for reliable operation at high speed without extremely close tolerances;

To provide a data translating device having inherently simple sub-unit replacement possibilities for replacing damaged parts;

To provide a data translating device having characteristics which permit easy assembly;

To provide such a device using materials which are easily worked in machine processes;

To provide a data translating device which lends itself to modern mass production techniques;

To provide a data translating device along such general functional lines as will readily permit modification to take advantage of manufacturing techniques of the future, as such techniques are developed.

Among still other objects are:

To provide a high speed wire printer which utilizes a minimum of data translation mechanism;

To provide a high speed wire printer capable of being manufactured and maintained at a minimum cost;

To provide a compact high speed wire printer which can print on an object while that object is in flight;

To provide a high speed wire printer using an integral controlling mechanism, and thereby giving the most efficient service possible.

My invention comprises a new combination of electrical and mechanical functonal units which provides for high mechanical speeds, compactness, inherent simplicity, and ease of assembly, and which permits of the very latest in electrical and mechanical manufacturing techniques. The data translator disclosed consists of preformed circuit boards of a standard design, individually pluggable into a main frame, which circuit boards have simple wire contacts thereon for making different connections between the conductors thereof, said wire contacts being selectively switchably by cam operated sliding members of a very simple design. The cams are operatively connected to combinations of sliding members in response to interposers operated by electrostatic clutches. This invention further contemplates a simple wire printer which is made possible by the application of the data translator disclosed herein. Both of these inventive features are shown by way of example as embodied in a record card end-printing machine.

The foregoing and other objects, features and advantages of my invention will be apparent from the following more particular description of preferred embodiments thereof, as illustrated in the accompanying drawings.

Fig. 1b is a perspective view of the top and back of the data translating device shown in Fig. 1a.

Fig. 6 is a detailed, partial side elevation of the switch contact actuators, the operating bails therefor, and the interposers which connect the operating bails to the contact actuators.

Fig. 7 is a detailed plan view of the interposer strap and electrostatic clutch for operating said strap.

Fig. 8a is a detailed side elevation of the interposer pin.

Fig. 8b is a detailed plan view of the interposer pin shown in Fig. 8a.

Fig. 9 is a diagram of the code bail and contact actuator motion.

Fig. 10a is a chart showing the well-known IBM code.

Fig. 10b is a diagram of the relationship between the code cams and the index points representable thereby.

Fig. 11 is a detailed side elevation of the contact actuator latching spring.

Fig. 15 is a timing diagram of the circuit shown in Fig. 14.

CONTENTS

| | Column |
|---|---|
| Brief description of wire printer and data translator (Figs. 1a and 1b) | 4 |
| Transfer plate (Figs. 2-5) | 7 |
| Mechanical coding details (Figs. 6-11 and 1b) | 8 |
| Control relay details (Figs. 12 and 13) | 10 |
| Core matrix and print wire control (Figs. 14 and 15) | 11 |
| Zero suppression (Figs. 14 and 15) | 13 |
| Summary | 14 |

Brief description of wire printer and data translator
(FIGS. 1a, 1b, 10a AND 10b)

The brief description in this section is augmented by detailed descriptions of the various parts in following sections.

Figure 1A:
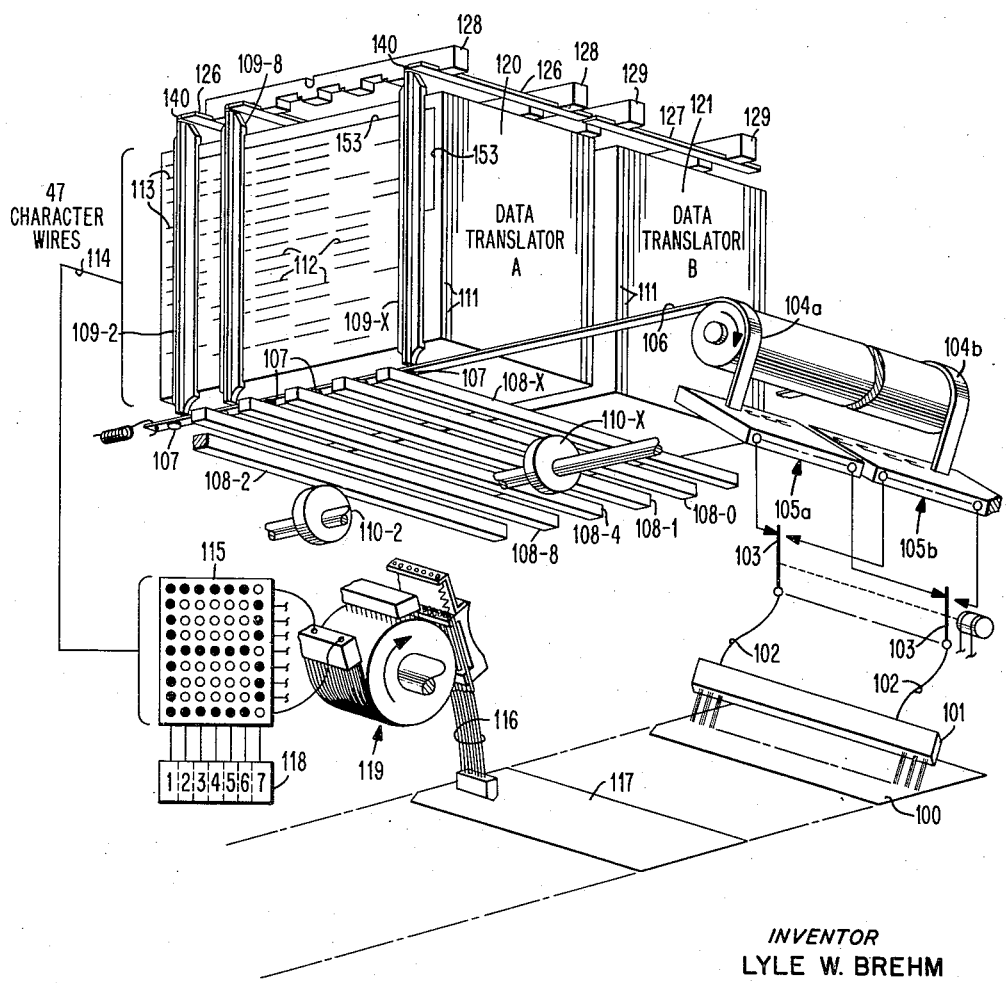
Fig. 1a is a perspective view of a wire printing machine and data translation device, showing the bottom, front and one side thereof.

In one illustrative embodiment of this invention shown in Fig. 1a, a record card 117 is shown being fed continuously from right to left by a set of well-known feed rollers (not shown) beneath a row of print wires 116 operable by electrostatic clutches 119. Wire printer of the type described, in which a single row of print wires 116 is selectively operated a plurality of times by electrostatic clutches 119 to build the image of a character on the printed sheet, is shown in my copending application Serial No. 854,146, Ultra Speed Printer, filed November 9, 1959. A second record card 100, being continuously fed in synchronism with the first card 117, passes beneath a set of sensing brushes 101, in which there is provided one brush element for each of the eighty columns on an IBM type of record card. Any twenty of the brushes can be connected by twenty corresponding control panel wires 102 to twenty sets of relay contacts 103, which contacts will connect the corresponding brushes to the input of a data translator 120, 121. It will be seen from the relative positions of the record card 100 and the record card 117, that one record card will be reading into the data translator during the time in which the data translator is controlling the printing of another record card in the more advanced feeding position. Therefore, the data translator is divided into two sections, and as the record card 100 is being read into the Data Translator A 120 (the contacts 103 being in the position shown) the electrostatic clutches 119 cause the print wires 116 to print in response to the Data Translator B 121. As a series of cards are fed through the machine, each will similarly be printed under the control of data previously read from it and stored in one of the data translators 120 or 121, while a subsequent card is being read into the other of the data translators 121 or 120, respectively. Alternate cards are read into, and are printed under the control of, the same one of the data translators 120, 121.

Figure 1B:
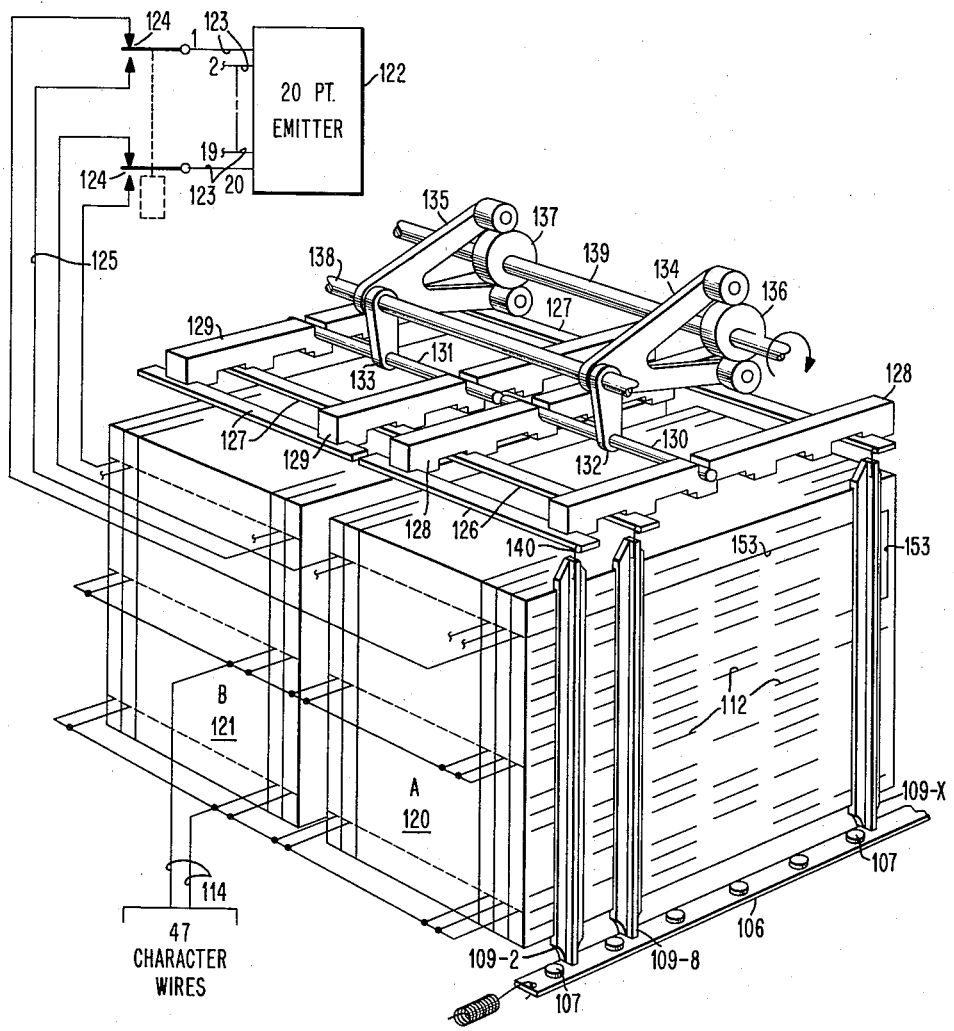

Each of the data translators 120, 121 comprise a plurality of transfer plates 111, each of which is a complete and individual card that is pluggable into a main frame portion of the data translator (not shown), and each comprises circuitry electrically similar in function to well-known relay transfer trees. There is provided one transfer plate 111 for each of the twenty columns of a record card being sensed and, accordingly, for each printable character space on the record card. The branches of the transfer plate circuitry are schematically represented in Figs. 1a and 1b, by the horizontal lines 112. Each transfer plate 111 is provided with wire switches (not shown in Fig. 1a) which direct the flow of data through the circuitry thereof. The wire switches are arranged in six vertical rows individually transferable by a corresponding one out of six contact actuators 109-2, 109-8, ... 109-X, each of which represents a bit in a six-bit code, the operation of which will be described with reference to Figs. 10a and 10b as well as Fig. 1a.

The well-known IBM record card code is shown in Fig. 10a, wherein four zone possibilities 12, 11, 0, and "N" (or no zone) are shown across the top of the diagram; the possible numerals 1, 2, ... 0, 8-3, and 8-4 are shown down the left side, and the characters which are represented by combinations of these zones and numerals are shown in matrix form. Any of the combinations shown in Fig. 10a may be punched in the record card. The transfer of the rows of switch contacts in the transfer plates 111 by the contact actuators 109-2, 109-8, ... 109-X is caused by six corresponding code cams 110-2, 110-8, ... 110-X rotating synchronously with the card feed in relation to the IBM code as shown in Fig. 10b. The reading of a record card is divided into times at which the different index points (9, 8, . . . 1, 0, 11, 12) pass beneath the brushes in sequence. At each of these times at least one of the cams 110–2, 110–8, . . . 110–X will have a lobe thereon in an upward position, which lobe will raise a bail 108–2, 108–8, . . . 108–X (Fig. 1a) corresponding to the cam. For instance, a "C" in the IBM code is represented by a 3-hole and a 12-hole. At 3-time, when the 3-hole will be sensed, the cams 110–2 and 110–1 will each raise their respective bails 108–2 and 108–1, according to the cam diagram in Fig. 10b. At 12-time (when the 12-hole will be sensed) the cams 110–0 and 110–X will raise the respective bails 108–0 and 108–X. Similarly, each of the index points on a record card is represented by combinations of the six-bit code as shown in Fig. 10b.

Each of the code bails 108–2, 110–8, . . . 110–X extends across and may operate any of the forty transfer plates 111 in the data translators 120 and 121. For each of the forty transfer plates 111, there is provided an interposer strap 106 which has six interposer pins 107 imbedded therein (see Fig. 1b). Each of the interposer pins 107, when moved slightly to the right from the position shown in Figs. 1a and 1b, serves to provide mechanical interconnection of the code bails 108 and related contact actuators 109. Therefore, as each code bail 108–2, 108–8, . . . 108–X is raised by its respective cam 110–2, 110–8, . . . 110–X, it will raise any of the forty related contact actuators 109–2, 109–8, . . . 109–X corresponding to a transfer plate 111 and, accordingly, to a column of the record card, for which the associated interposer strap 106 has been shifted to the right. The interposer straps 106 are each connected to a respective electrostatic clutch 104a, 104b, which will pull the interposer strap 106 to the right when energized by data pulses fed through the relay contact 103 from the brushes 101. With the relay contacts in the position shown, the data pulses from the twenty columns of the record card 100 are fed to the clutches 104a in the clutch assembly 105a (corresponding to Data Translator A 120); when the relay contacts 103 are transferred, the clutches 104b in clutch assembly 105b receive the data pulses.

At the upper end of each of the contact actuators 109 (Fig. 1b) is a latch spring 140 which will hook over the top of a corresponding latch bail 126, 127 whenever the contact actuator is raised, and will hold the contact actuator in the upper position until such time as the latch bail 126 or 127 is reciprocated to the right, which permits the latch spring 140 to clear the latch bail 126 and allow the contact actuator to drop in preparation for a further cycle, as described in more detail hereinafter.

At the top of Fig. 1b is shown an emitter 122 which provides a sequence of pulses from 1 to 20, on each of twenty different output lines 123. Each of the output lines 123 feeds a set of relay contacts 124 which selectively direct the 20-point emitter pulses to either Data Translator A 120 or Data Translator B 121 over forty corresponding lines 125. Each of the twenty emitter pulses enters the corresponding transfer plate 111 at the back end thereof (left in Figs. 1a and 1b), is carried to the front end by a circuit 153, and is then selectively routed through the transfer circuitry by the wire switches which are selectively transferred in response to the cam operated contact actuators 109. The 20-point emitter pulses are applied to respective transfer plates 111 one at a time, so that each transfer plate receives a pulse, one after the other.

For each character which may be printed, there will be only one output line in each of the transfer plates 111 (shown schematically as the horizontal lines 113 at the extreme left of the transfer plates 111 in Fig. 1a). Each of the outputs 113 is connected by character wire 114 to a simple magnetic core matrix 115, the cores of which are laid out in the same arrangement as the matrix of dots which may be printed to form the configurations of printable characters. Referring to Fig. 1b, it can be seen that each character output 113 of all of the coding plates in both Data Translator A 120 and Data Translator B 121 are connected together in parallel (for instance, all "A's;" all "M's") so that each is connected to a single corresponding character wire 114 which threads the appropriate cores within the matrix 115. The core matrix 115 has nine columns of cores arranged in seven rows, there being one column of cores for each of nine print wires 116, and therefore, one core for each of the possible print positions in which one of the print wires 116 may cause a dot to be printed on the record card 117. Each character wire 114 is threaded so as to saturate each core which is in a position in the matrix 115 corresponding to a printing position used in the configuration of the related character. When the character is stored in the core matrix 115, a 7-point ring 118 will drive out each of the seven rows of the matrix, one at a time. The outputs from the cores are connected to print clutches 119, there being one print clutch associated with each of the nine columns of cores. As each clutch is energized, the corresponding print wire 116 will be forced downward so as to impress a carbon ribbon or other carbon transfer medium of any well-known type (not shown), and thereby print a dot on the record card 117. To print a character, selective combinations of print wires will be operated seven times, once for each row of cores in the matrix 115.

In review of the operation of the wire printer and data translator shown in Figs. 1a and 1b, each time a brush senses a hole in any given column of a record card 100, a pulse passes over a line 102 through a contact 103 to energize an electrostatic clutch 104. This pulls an interposer tape 106 to the right, thereby disposing interposer pins 107 between all of the code bails 108 and the contact actuators 109 corresponding to the transfer plate 111 associated with the column of the card 100 being sensed, which will render the related contact actuators 109 responsive to the code bails 108. Assuming a "B" to be punched in one column of the card, the corresponding electrostatic clutch 105 will be operated first at 2-time, when the code bail 108–2 will be raised by the cam 110–2, causing the respective interposer strap 106 to be moved to the right and the respective contact actuator 109–2 to be raised and become latched. A short time later, when the 12-hole is sensed in the card, the electrostatic clutch will be energized again, and the interposers 107 transferred, lobes on the 0-cams and X-cams will raise the digit bails 108–0 and 108–X, causing the corresponding contact actuators 109–0 and 109–X to be raised and become latched in the upper position. After the entire card is read, the 20-point emitter (Fig. 1b) begins sending pulses through the correct relay contact 124 to each of the twenty transfer plates 111 in the one of the data translators (A, 120 or B, 121) which had just been read into. Each of the twenty wires going to either of the data translators is energized in turn, one after the other, by the 20-point emitter; these pulses are applied to the left end of the transfer plate, and carried around to the right end of the transfer plate, and thereafter begin to thread their way through the circuitry and wire switch contacts represented by the lines 112. For any combination of the contact actuators 109, the pulse will find its way to only one of the forty-seven character output wires 114, for instance a B-wire. The pulse translated through the transfer plate circuitry onto the correct one of the character wires 114 will pass through each of the cores represented in the configuration of the character (for instance "B," as shown in the core matrix 115). Each of the seven rows of cores is then driven in turn so that those of the nine cores in each row which have been set by a pulse on the character wire 114 will energize the corresponding electrostatic clutches 119 and cause the related print wires 116 to print dots on the card 117.

Transfer plate
(FIGS. 2–5)

The transfer plate 111 as shown in Figs. 1a and 1b is merely a schematic representation of the plate as shown in Figs. 2–5.

Figure 3:
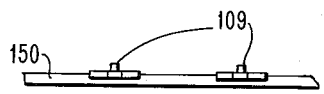
Fig. 3 is a plan view of a portion of the transfer plate shown in Fig. 2 and switch actuators therefor.
Figure 2:
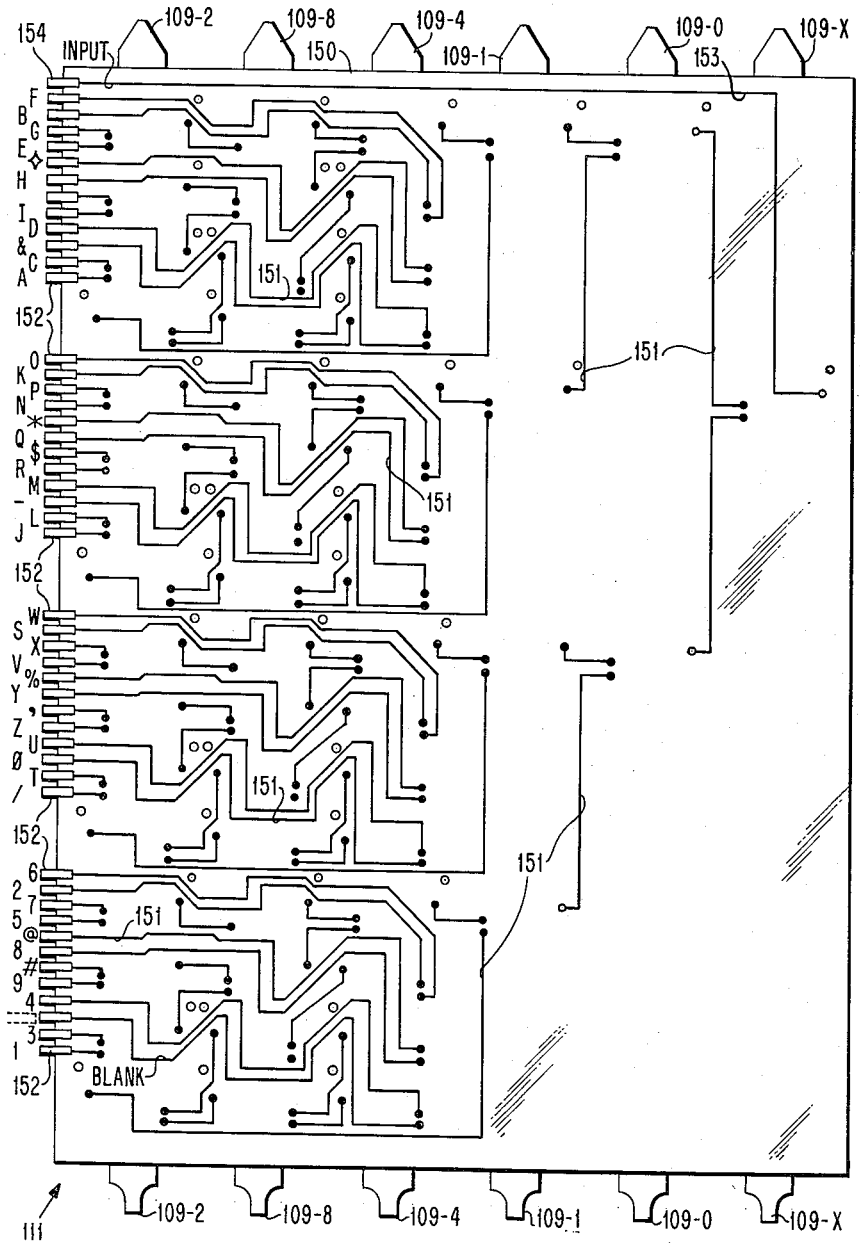
Fig. 2 is a front elevation of a transfer plate, showing the printed circuitry thereon.
Figure 4:
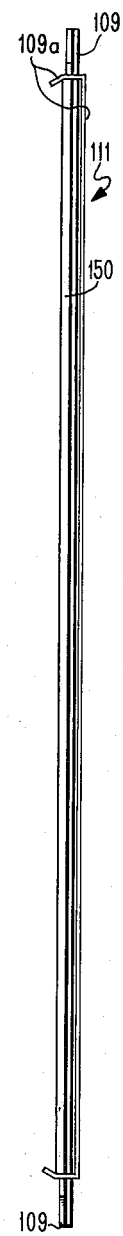
Fig. 4 is a side elevation of the transfer plate and switch actuators shown in Fig. 3.

In Figs. 2–4 is shown a transfer plate 111 which comprises a main body portion 150 having conductor elements 151 (schematically shown as line 112 in Figs. 1a and 1b) embedded therein, some of which elements terminate in plug-in contacts 152 (shown schematically in Fig. 1a as horizontal lines 113), each of which contacts corresponds to one of the forty-seven characters to be printed. An additional circuit 153 within said main body portion terminates in a contact 154 and serves to conduct the 20-point emitter pulses to the right end of the plate so the pulse may transfer through the circuits and switch contacts therein. The main body portion may be made of fiber, with the circuitry 151, 153 being conductive material deposited thereon as are the "cards" in the well-known printed circuit art; alternatively, the main body portion 150 may be any suitable plastic material having wires suitably embedded therein to form the circuits 151, 153. The transfer plate is designed to plug into a frame member, comprising any suitable one of the well-known types of "card gates," which have a plurality of plugs to receive the contacts 152, 154, and which also serve as part of the mechanical support therefor. Twenty of the transfer plates 111 may be plugged into a frame member, side by side, to comprise the Data Translator A 120, and twenty more can be plugged in side by side to comprise the Data Translator B 121 (Figs. 1a and 1b). The main body 150 is grooved to provide slide-ways for the contact actuators 109, as shown in Fig. 3. The grooves may be tapered (or dove-tailed) to hold the contact actuators from moving away from the main body portion, or the grooves may be square, and simple clips (not shown) provided to slidably hold the contact actuators 109 within the grooves of the main body portion 150. The end view of the main body portion 150 and the contact actuators 109, is shown in Fig. 4 which also shows a simple plastic snap-on cover 109a. The cover 109a, which is a third way of holding the contact actuators 109 in place, will also serve to reduce the dust deposit on the contact actuator side of the transfer plate 111. However, this will also increase the overall thickness of each transfer plate, and therefore the size of the machine. The choice in the above holding means can be made to suit design expediency, in particular applications of the invention.

Figure 5:
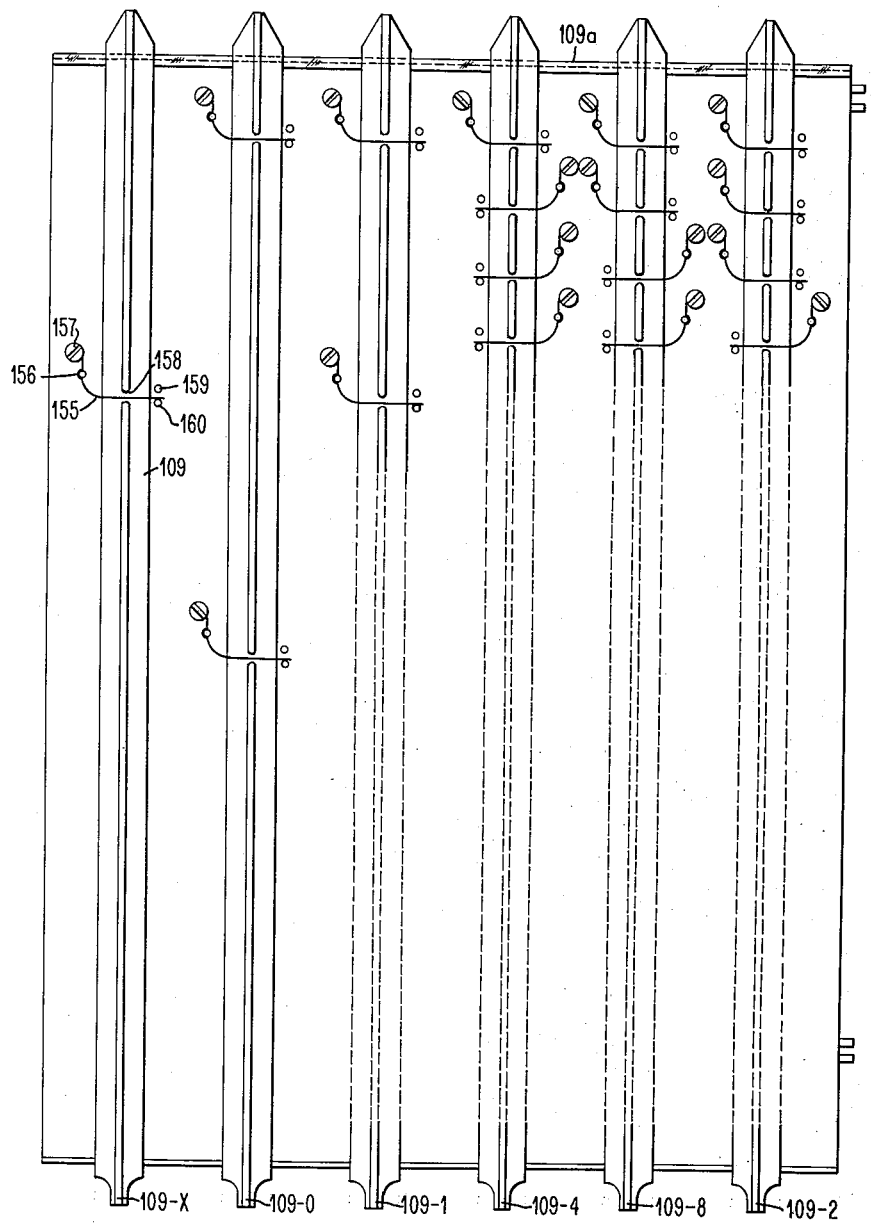
Fig. 5 is a back elevation of the transfer plate shown in Fig. 2, showing the wire switch contacts and switch contact actuators thereon.
Figure 5A:
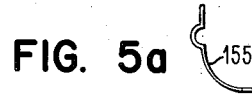
Fig. 5a is a detailed elevation of a switch contact wire.

The side of the transfer plate opposite to that seen in Fig. 2, and the contact actuators 109, are shown in Fig. 5. Associated with each contact actuator 109 are a number of switch contact wires 155 (shown in detail in Fig. 5a), each of which is retained by being bent around an input pin 156, an adjustment screw 157, a notch 158 in the contact actuator 109, and two output pins 159 and 160. The input and output pins may be the extremities of embedded conductors or other well-known printed-circuit posts. Whenever a contact actuator 109 is in the upward position, the related switch contact wires 155 no longer make contact with the lower output contacts 160, but make contact with the upper output contacts 159 instead. This is the way in which the 20-point emitter pulses are transferred through the different circuits so as to be directed to only one of the plug-in contacts 152 at the right side of Fig. 5 for any given setting of the contact actuators 109. The circuits shown are designed to route the emitter pulses so as to appear at the contact 152 corresponding to the character represented in the six-bit intermediate code (2, 8, 4, 1, 0, and X) by the contact actuators 109–2, 109–8, ... 109–X actually transferred, as described hereinbefore. Each of the contact actuators is a simple flat piece, with a notched-rib on one side; the notches in the ribs serve to transfer the related switch contact wires 155 when the contact actuator is raised. Although shown in Fig. 5 with only one notch per switch contact actually related thereto, the contact actuators 109 can each be made with sufficient notches 158 to transfer any possible contacts, and thus serve in all six positions. Furthermore, only a few of the switch contacts are shown, it being understood that one switch contact is to be provided for each set of pins (input pin 156 and output pins 159, 160) shown in Fig. 2. This simple design permits molding the contact actuators of any suitable plastic material, or light die-casting metal. The adjustment screws 157 are eccentric, and are rotated to provide proper tension on the switch contact wires.

Mechanical coding details
(FIGS. 6–9, 11, AND 1b)

Fig. 6 is a side elevation showing the detailed relationship of the code cams 110, code bails 108, interposers 107, contact actuators 109 and electrostatic clutches 105. The code cams 110 are each fixed on a continuously rotating shaft 161 which rotates one revolution in each card feeding cycle; at each index point time (for instance 9-time, or 2-time), the cams which represent that index point in the six-bit code (for instance, 110–8 and 110–1, or 110–2) will each have a lobe in an upward position to raise the related bail (for instance 108–8 and 108–1, or 108–2) as successive cards are fed. Although only a single set of code cams is shown in Fig. 1a, two or more cams 110 per bail 108 may be used, since this would provide for nearly horizontal operation of the code bails 108, and would assist some well-known mechanical framework (not shown) in holding the code bails 108 in place. By way of example, a framework 162 is shown at the upper ends of the code bails 108, which serves (as shown) to support, align, and guide the motion of the interposer strap 106, which motion is caused in part by a spring 163. The framework 162 may be modified (according to design expediency) so as to provide a guide for the contact actuators 109 and/or the code bails 108.

The electrostatic clutch assembly 105 (Figs. 6 and 7) comprises the clutch strap 104 and a continuously rotating semiconductive clutch roller 164 of the type described in my aforementioned copending application. As is shown in Fig. 1a and Fig. 7, one clutch roller 164 is sufficient to serve the forty electrostatic clutch straps 104 in the machine. The roller is maintained at a neutral or ground potential. When an electrical potential is applied to the clutch strap, for instance at the terminal 165, an electrostatic potential appears between the strap 104 and the semiconductive roller 164, which causes the roller and strap to be attracted to one another. The strap 104 thereby resiliently adheres to the roller 164 during such time as the potential is applied thereto, and the strap will move in a clockwise direction with the roller, drawing the interposer strap 106 to the right in Fig. 6 against the action of the spring 163. The electrostatic clutch must be insulated from the interposer pins 107; this may be done by using a nonconductive interposer strap 106 (for instance "Mylar" or other tough polyester film of any well-known type), or the interposer strap 106 could be made of flexible metal or other material and an insulating joint 166 could be provided.

The interposer pins are pulled to the right so as to form a mechanical junction between the code bails 108 and related contact actuators 109. An upward driving of code bail 108 will force the interposer pin 107 upward, which transmits the code bail motion to the contact actuator 109. When the code bail 108 is lowered, the contact actuator is latched in an upward position as before mentioned, and more fully described later herein; it is necessary that the interposer pins be lowered with the code bails 108 so that when the electrostatic clutch 105 is disengaged, the spring 163 can pull the interposer strap 106, to the left, thus readying the device for the next cycle of input. Therefore, it is contemplated that the interposer pins 107 can be magnetized so as to adhere to the code bails 108, which also may be made of a magnetizable material. Since the contact actuators 109 may be any plastic or die-casting metal, the interposer pins 107 will be magnetically attracted to the code bails, but not to the contact actuators 109, and will therefore follow the code bails down after the latching of the contact actuators 109. In the preferred form, shown in Figs. 8a and 8b, the interposer pins 107 are contemplated as being pluglike bodies, designed so that they can be easily snapped into place on the interposer strap 106.

Fig. 9 illustrates the motions involved in the mechanism shown in Fig. 6. During each cycle point (shown by arrows 171), different ones of the code bails will be raised by respective code cams 110; if a code bail is raised, the interposer pin 107 corresponding to a contact actuator 109 may or may not be in place so as to transmit the motion of the code bail to the contact actuator. As shown by the arrows 166, a certain amount of clearance is provided between the contact actuators 109 and the code bails 108, which is to permit the interposer pins 107 to slide therebetween. The displacement of the interposer pins from left to right is shown by the arrows 167. The arrows 168 show the code bail displacement (having a Rise portion 172 and a Fall portion 173) which may be a very small fraction of an inch (perhaps 0.020 inch). The arrows 169 illustrate the displacement of the contact actuator, which is greater than is necessary to transfer the switches (by an amount illustrated by arrows 170) so as to provide for sufficient overtravel to allow the latch springs 140 to become lodged over the latch bails 126.

In Fig. 11, the latch spring 140 is shown to be lodged within a slot 174 in the contact actuator 109. The dotted portion of the latch spring 140 illustrates how the latch spring bends or flexes away from the latch bail 126 so as to snap over the latch bail when the contact actuator 109 is raised. The latch spring 140 will remain in the position as shown until the latch bail 126 is moved to the right by a pair of reset cams 136 and 137 (Fig. 1b) and associated mechanisms at reset time. Each of the latch bails 126, 127 (Fig. 1b) is connected at opposite ends thereof to respective pairs of members 128, 129, each pair being individually reciprocable by rods 130 and 131. The rods 130 and 131 are caused to rock slightly toward the back right of Fig. 1b by a pair of arms 132, 133 which are pinned to respective complementary cam followers responsive to the surfaces of cams 136, 137 for rotation about an axle member 138. Each of cams 136 and 137 has its maximum eccentricity diametrically opposite to the maximum point of the other, about the continuously rotating shaft 139. The shaft 139 operates at half speed so that once in each card feed cycle, only one of the camming lobes 136 or 137 will cause the respective complementary cam follower 134 or 135 to rock slightly counterclockwise about the axle member 138, which in turn causes the respective arm 132 or 133 and rod 130 or 131 to reciprocate on a short stroke toward the rear right in Fig. 1b. This of course will cause the related members 128 or 129 to reciprocate, which in turn causes each of the resettable latch bails 126 or 127 to reciprocate slightly to the right rear of Fig. 1b. Each latch bail 126, 127 is reciprocated once in alternative cycles.

It should be noted that a large number of variations in the mechanical details of this embodiment can be made without departing from the functional relationships disclosed. In any application of the invention, the details may be modified to provide the best results of the entire machine.

*Control relay details*

(FIGS. 12 AND 13)

Figure 12:
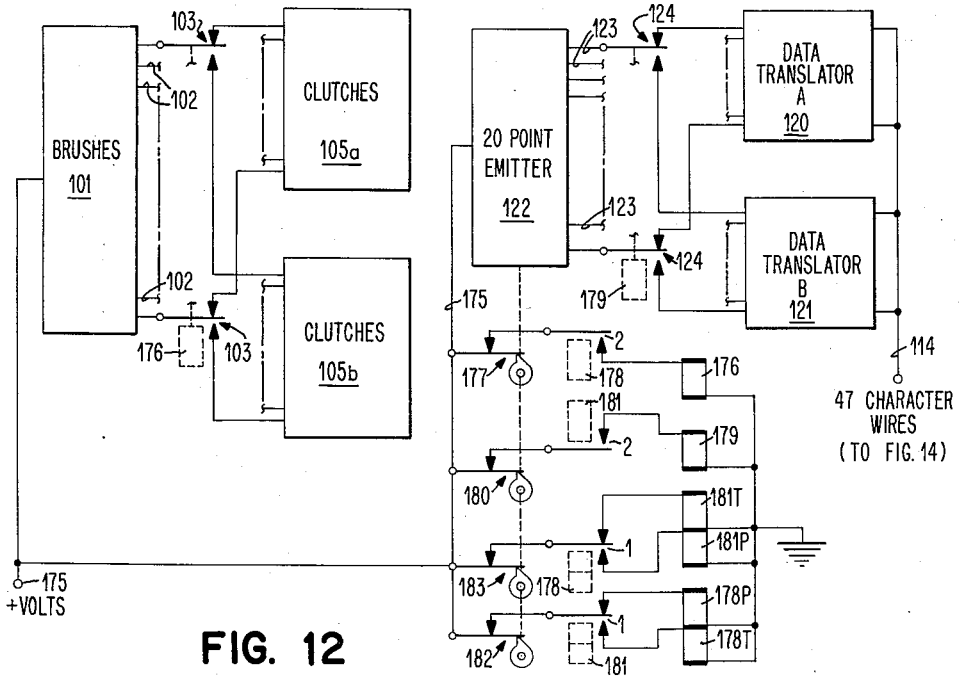
Fig. 12 is a schematic diagram showing the circuitry used to control the entry and retrieval of data alternatively.

Shown in Fig. 12 is a block diagram of the electrical circuitry which generates individual pulses on selective ones of the forty-seven character wires 114 in response to the sensing of holes in a record card 100. Particularly, a group of relays for controlling the transfer of record card pulses and emitter pulses to the data translators are shown. At the lower left of Fig. 12 is a contact 175 to which is applied positive machine voltage for operating the electrostatic clutches 105 in response to the brush-sensing of record cards, for operating the 20-point emitter, and for operating the control relays. As before described, twenty relay contacts 103 direct the brush-sensed pulses on lines 102 to either of the electrostatic clutch assemblies 105a or 105b, alternatively. The transfer of these contacts 103 is effected by a relay coil 176 selectively energized from the machine voltage line 175 by a circuit breaker 177 which is continuously rotating in synchronism with the card feed, the 20-point emitter, and the reset cam shaft 139. In addition to the circuit breaker 177, the relay coil 176 is controlled by the normally open 2-contact of a control relay 178. Also before described, twenty relay contacts 124 distribute the 20-point emitter pulses between either of the data translators 120 or 121 alternatively. These relay contacts are controlled by the relay coil 179 which in turn is energized by a circuit breaker 180 and a normally open 2-contact of a control relay 181. The control relays 178, 181 are latch-type relays, and each has a pick coil 178P, 181P and a trip coil 178T, 181T, respectively. When energized, the pick coil transfers the armature so as to open the normally closed contacts and close the normally open contacts. The relay will remain in the transferred position until the trip coil thereof is energized, at which time the relay armatures will transfer back to the disenergized condition, causing the normally closed contacts to be closed, etc. Each of the control relays 178, 181 is operated in repsonse to a circuit breaker 182, 183, respectively, and the number one contact points from the other of the control relays. Referring again briefly to Figs. 1a and 1b, the record card will be read into one data translator under the direction of the relay contacts 103 and the other data translator will be pulsed by the 20-point emitter under the direction of the relay contacts 124. It can be seen therefore that relays 176 and 179 which control these contacts (respectively) are energized alternatively; that is, during one cycle relay 176 will be energized and relay 179 will be disenergized and during the next cycle, relay 179 will be energized and relay 176 will be disenergized.

Figure 13:
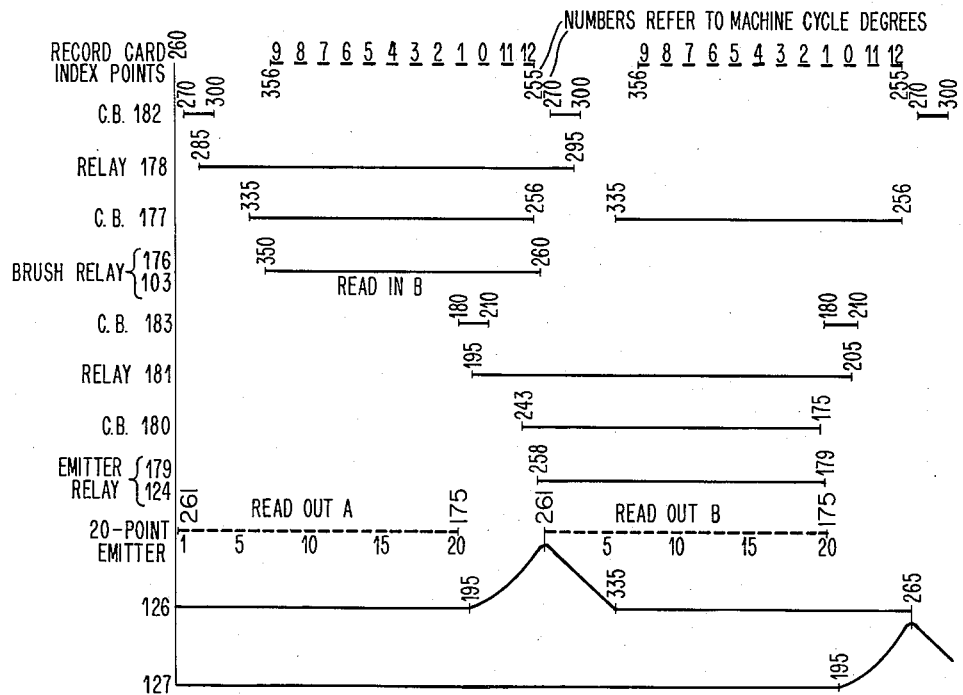
Fig. 13 is a timing diagram of the circuit shown in Fig. 12.

The manner in which this relay circuitry operates is best understood with reference to the timing diagram in Fig. 13, wherein the circuit breaker and relay closed times are shown. Also shown are the machine cycle degrees, which are based on the conventional reference of having the first index point on the record card to be read (a "9") appear beneath the brushes at 356 degrees, and therefore, allowing for the mechanical time necessary for the brush to make contact through the hole, the 9-pulse actually begins at about zero degrees.

In Fig. 13 it is assumed that a prior card has been read into Data Translator A, and that beginning with Fig. 13, a card will be printed in response to Data Translator A and another card will be read into Data Translator B. At 260 degrees, all of the circuits are in the normal (or disenergized) state, and this will be taken as the beginning point for describing the operation of Fig. 12.

First, circuit breaker 182 closes at 270 degrees; since all the circuits in Fig. 12 are disenergized prior to this time, machine voltage will be applied through the circuit breaker 182 and through the normally-closed 1-contact of the control relay 181 to energize the pick coil of the control relay 178. Relay 178 is shown as becoming closed at 285 degrees although the circuit breaker closed at 270 degrees; this is because of the inductive and mechanical times required at high speeds to close relay contacts after the coil thereof is energized. Depending on the type of relays used and the machine speed in any application of this invention, the operating time lag may be less; it suffices if each circuit responds within the period of a cycle shown. Next, circuit breaker 177 closes at 335 degrees and applies machine voltage from the line 175 to the brush relay coil 176 through the normally open 2-contact of relay 178, now closed. When relay 176 becomes energized (by 350 degrees), all of the twenty sets of contacts 103 which connect the brushes 101 to the electrostatic clutches 105 are transferred, thereby directing the brush reading pulses on lines 102 to the electrostatic clutch assembly 105b. Immediately thereafter, between 356 degrees and 255 degrees, all of the index point rows 9, 8, . . . 12 in twenty columns of the card appear beneath the brushes 101, and the holes therein are sensed. The electrostatic clutches 105b selectively transfer the interposer straps 106 as the holes in corresponding columns are sensed, and the data on the record card becomes stored in the form of latched contact actuators 109 in Data Translator B 121. During this time, the emitter relay 179 is disenergized, so that each of the twenty relay contacts 124 are in the normally closed position, directing the 20-point emitter pulses to Data Translator A 120. Therefore each of the twenty transfer plates 111 in Data Translator A directed each of the corresponding 20-point emitter pulses to the correct ones of the character wires 114. Immediately following the time in which any 12-hole could be sensed by the brushes 101, the circuit breaker 177 opens at 256 degrees, which causes the brush relay contacts 103 to become open by 260 degrees.

Prior to completely reading the record card into Data Translator B, however, the circuit breaker 183 closes at 180 degrees (about the time that the 1-holes are being sensed). When circuit breaker 183 closes, it connects the machine voltage line 175 through the normally open 1-contact of the control relay 178 (which is still in the energized state as shown above) so as to energize the pick coil 181P of the other control relay. After relay 181 becomes energized, the circuit breaker 180 closes at 243 degrees and connects the machine voltage line 175, through the normally open 2-contact of the control relay 181, to the coil of the emitter relay 179. As a result, all of the twenty emitter relay contacts 124 are transferred at 258 degrees, so that the 20-point emitter pulses are directed to Data Translator B 121 after that time. As Data Translator B is read out, the next card will read into Data Translator A through the normally closed brush relay contacts 103, which closed when the brush relay coil 176 became disenergized at 260 degrees. Subsequent pairs of card feed cycles (after those shown in Fig. 13) are identical with the two cycles just described.

Figure 14:
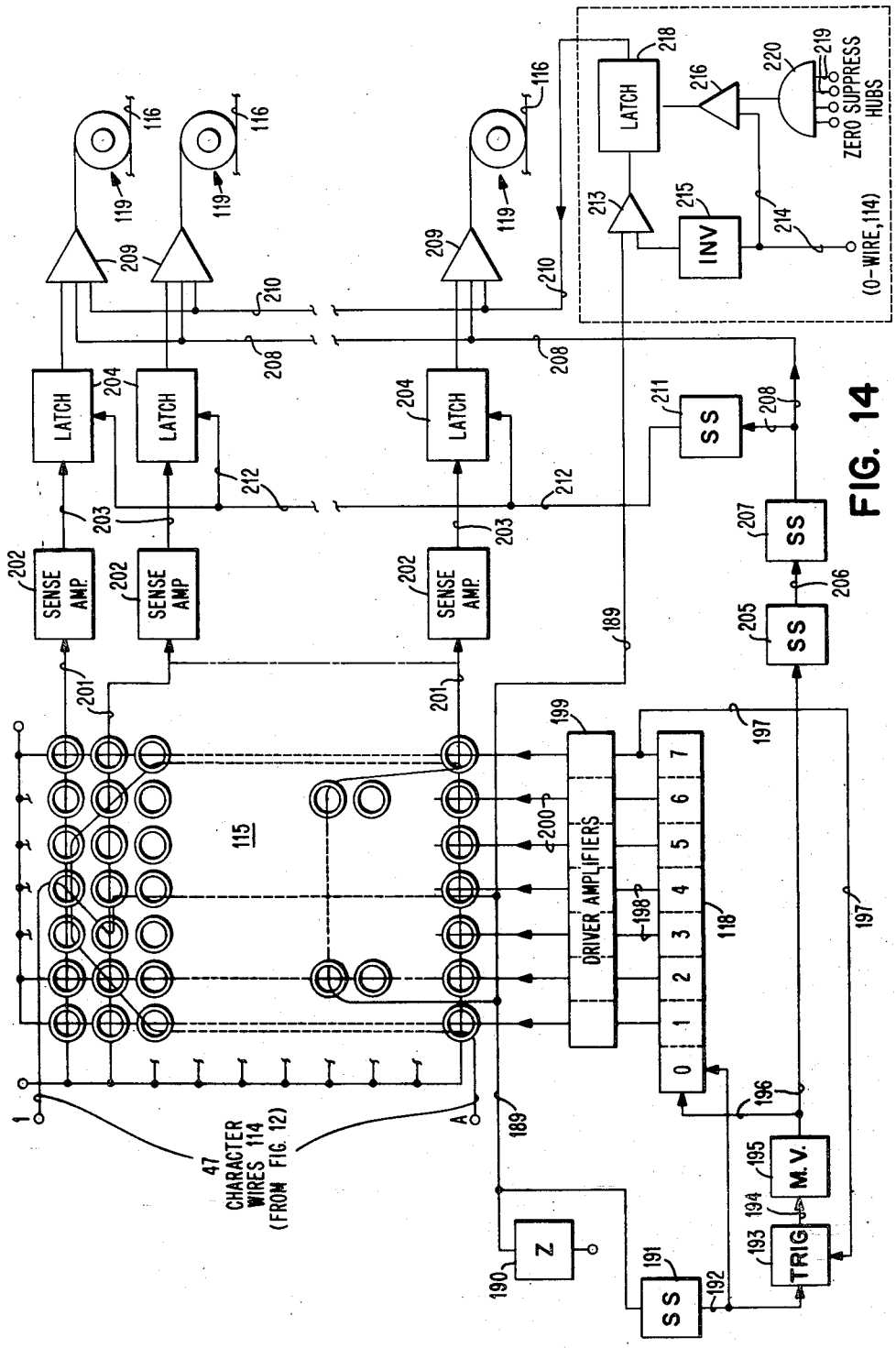
Fig. 14 is a schematic diagram of the circuitry used to control the wire print elements.

*Core matrix and print wire control*
(FIGS. 14 AND 15)

Referring now to Fig. 14, each of the 47 character wires from Fig. 12 winds its way through the core matrix in such a way as to duplicate the configuration of a character which is to be printed. As examples, the threading of the wires 114 for the numeral "1" and for the letter "A" are shown. Referring back to Fig. 12 briefly, each time a 20-point emitter pulse appears in one of the transfer plates 111 in either of the data translators 120, 121, the 20-point emitter pulse will be directed onto one of the character wires 114 depending upon the combination of contact actuators which were set up. Therefore, it is the 20-point emitter pulse which travels over the character wires 114 within the core matrix 115. All of the character wires 114 are connected to a common wire 189 which terminates in a resistance 190 or other suitable impedance; the voltage developed by the resistance 190 is applied to the input of a single shot (or monostable multivibrator) 191. This starts the read-out operation, the understanding of which is made easier by constant reference to Fig. 15. When the emitter pulse on the line 189 disappears, the negative swing of voltage at the input of the single shot 191 causes a positive pulse (of duration determined by the design parameters thereof) to appear on an output line 192. The positive pulse on line 192 is fed to the 7-point ring 118 and resets it with the 0-stage on. When the positive pulse line 192 falls, the negative swing thereof appears at the input of a trigger 193, and turns the trigger on. With the trigger 193 on, its output line 194 is raised and this turns on a gated free-running multivibrator 195, which supplies pulses over its output line 196 to cause the 7-point ring 118 to step from its zero stage through each of its seven stages in turn. When the multivibrator steps the 7-point ring 118 for the eighth time, the seventh stage turns off, and the negative swing thereof is applied by a line 197 to a reset input of the trigger 193 which turns the trigger off. When the trigger turns off, the multivibrator stops sending pulses to the 7-point ring 118.

As each stage of the 7-point ring 118 turns on, a corresponding line 198 goes positive and causes a related one of a set of seven driver amplifiers 199 to send driving current over a corresponding line 200 in the direction shown by the arrows. The lines 200 thread the cores within the matrix 115 oppositely to the manner in which the character wires 114 thread the cores. In operation, when a current appears on one of the character lines 114 (for example the "1" line shown), it will cause counterclockwise saturation flux in each core through which it passes. Later, as each of the driver amplifiers drives the corresponding row of nine cores, the cores tend to be switched with saturation flux in the clockwise direction, so that each of the cores which had been previously put into the counterclockwise direction (by current on one of the character wires 114) will switch to the clockwise direction. The switching of the cores when driven induces a voltage (in the direction shown) on each of nine sense windings 201; this voltage is fed to corresponding sense amplifiers 202 which send pulses over corresponding wires 203 to turn on respective print latches 204. The latches are thereby selectively set to represent only those cores in the row being sensed which are used in the configuration of the character to be printed. It can be seen that the operation of this circuit is serial row by row, for each of the seven rows of cores corresponding to one stage of the 7-point ring. Printing is effected for each row of cores prior to sensing the next row of cores. Each core in a row corresponds to one of the print wires 116; therefore, seven firings of different combinations of print wires 116 are required for each setting of the core matrix 115 in response to any of the forty-seven character wires 114.

Each time the multivibrator 195 sends a pulse over line 196 to step the seven stage ring 118, it also sends a pulse to a second single shot 205 which responds to the negative swing at the end of each multivibrator pulse to generate a positive pulse. The duration of this positive pulse is equal to, or a little greater than, the time required for the seven-stage ring 118 to drive out the row of cores and to turn on the print latches 204 in response thereto. The output of the single shot 205 is applied over a line 206 to a third single shot 207, which responds to a negative swing at the end of the positive pulse to generate another pulse of given duration on a line 208. The duration is determined by the length of time that the electrostatic clutches 119 must be energized in order to effect printing, which is about 150 microseconds for clutches of the type described. The output of the single shot 207 is applied to a plurality of AND circuits 209 which are conditioned by the print latches 204 in response to selected cores corresponding to the character to be printed. The other input to the AND circuits 209 is a zero suppress line 210, which is always positive except when a redundant zero is stored in the core matrix 115, as described hereinafter. The output of the single shot 207 is also applied to a fourth single shot 211 which responds to the negative swing at the end of the pulse on line 208 to generate a pulse on line 212 for resetting each of the latches 204. In this manner resetting of the latches takes place a short time following the end of the print clutch firing pulse on the line 208, in preparation for the next row of cores which are to control printing.

Referring now to the top of Fig. 15, three 20-point emitter pulses are shown, which correspond to any three of the 20-point emitter pulses at the bottom of Fig. 13. Assuming a card feeding rate of 250 cards per minute, each of the two card cycles shown in Fig. 13 will require about 240 milliseconds. In order to print seven rows of dots per character, and have three dot-spaces between each character, the 20-point emitter pulses must come about 9 milliseconds apart (Fig. 15), giving a total read-out time of about 180 milliseconds in each card cycle in Fig. 13. The 20-point pulses are shown in Fig. 15, for the 250 card per minute example being discussed, the 20-point emitter pulses are shown to be about 1.8 milliseconds long. The trigger 193 is on during the remaining 7.2 milliseconds, and the reading out of the rows of cores is shown to take about 500 microseconds per row. The most critical time duration is the length of the print pulse output from single shot 207, which must be a minimum of 150 microseconds as before described. Therefore, allowing about 10 microseconds each for the single shots 205 and 211, the machine could print each row in about 170 microseconds, as far as the circuit of Fig. 14 is concerned. However, the mechanical limitations of the code cams and bails, the interposers, and the contact actuators, will limit the card speed to about 500 cards per minute, which will give a period of about 250 microseconds for printing each row of dots.

The 20-point emitter pulse cannot appear on the character wires 114, and read data into the core matrix 115, until the seventh row of the core matrix is read out into the latches 204. Since the end of the 20-point emitter pulses start the read-out operation, the duration of the pulse, at any given machine speed, must be either accurately controlled, or else of shorter duration than shown in Fig. 15. For instance, a 1.8 millisecond pulse in the 250 card per minute example given above would mean that the 20-point emitter pulse would occur about 1 millisecond after the seventh row was read out, and the length of the pulse could vary by that amount. A means for closely regulating the duration would be a 20-point emitter having both "make" contacts and "break" contacts of the type which can be adjusted for accurate operation. Alternatively, the required pulse length could be obtained by inserting a pulse transformer and amplifier in each of the forty-seven character wires 114; this would give a pulse of a desired duration, and yet supply sufficient power to switch the cores in the matrix 115.

*Zero suppression*

(FIGS. 14 AND 15)

As is well known in the data processing art, it is frequently desirable to punch a zero in any unused column of a record card to show that no column has been overlooked in the punching operation. Of course, these zeros are not to be printed in most applications; therefore, zero suppression is frequently provided in record card printing machines. The zero suppression circuit disclosed herein is not part of the invention; however, it does demonstrate the flexibility of the invention, and the ease with which various adjunctive circuits can be applied thereto. In operation, a zero-suppress latch 218 is always on, giving a positive output on the line 210 to condition the AND circuits 209 for printing (as was assumed above), unless it is specifically shut off to cause zero suppression.

The one of the character wires 114 which corresponds to the numeral zero (0-wire not shown) is not connected at the bottom of the core matrix 115 to the common line 189, but is applied to a line 214 in the Zero Suppression circuit. Whenever the 0-wire is energized for printing a zero, a pulse will be applied to an AND circuit 216 which controls resetting of the latch 218. The other input to the AND circuit 216 may be any one of a number of Zero Suppress hubs 219 connected thereto by an OR circuit 220. The Zero Suppress hubs 219 may be selectively connected by control panel wiring to twenty corresponding hubs (not shown) which are connected to each of the outputs 123 of the 20-point emitter 122 (Fig. 12). Since each output of the 20-point emitter corresponds to one of the twenty possible printing positions (or character spaces) on the record card, zero suppression can be selected for any printing position in which the printing of zeros is known to be undesirable.

The latch will be reset by an output from the AND circuit 216 when there is coincidence between a zero pulse on a line 214 (derived from the 0-wire of the character wires 114) which means that a zero will print if not suppressed, and the output of the OR circuit 220, which means that one of the zero suppress hubs has been energized, and that the zero therefore should not print. The positive output on line 210 thereby disappears, and each of the AND circuits 209 will be blocked during the time that the zero would otherwise read out and print. Fig. 15 shows that the zero is set up in the print latches 204, but the zero suppress latch is off at this time, so the AND circuits 209 are blocked, and the clutches are therefore not operated. The next 20-point emitter pulse which represents a character on one of the character wires 114 will cause the common wire 189 to become energized; pulses on the line 189 are applied to an AND circuit 213 to indicate to the zero suppress circuit that a character is being stored in the matrix 115. At this time, assuming that the character to be printed is not a zero, the wire 214 will not be positive, so that the output of an inverter 215 will be positive concurrently with the positive pulse on the common wire 189. Therefore the AND circuit 213 will have a positive output to turn on the latch 218, in which state it will remain until turned off again by a further concurrence of a zero character and the indication that zero suppression is to be effected.

*Summary*

The embodiment of the invention described by way of example is a wire printer which is responsive to twenty columns of a record card to print corresponding characters on a single line thereof. Of course, a greater or lesser number of brushes, interposers and clutches, and transfer plates could be used to suit individual needs. Furthermore, in the device described, an additional forty brushes, twenty interposers and clutches, and forty transfer plates could be provided which, together with another core matrix and print wire assembly, would enable printing two lines of characters simultaneously.

The data translator described is suitable for use in a wide variety of data processing machines, and it is not intended to limit the scope thereof to printing. The manner in which the bails raise selected switch contact actuators allows a wide latitude in the amount of motion to be provided to the contact actuators. The switch contact wires need move only a very small fraction of an inch, and yet may yield to greater motions by bending upwardly in the middle. Therefore, the cams, bails and switch contact actuators may be manufactured without close tolerances. The electrostatic clutch assemblies are simple and inexpensive, and therefore lend themselves to mass production. The transfer plates may easily be installed into "card gates," and may be replaced very simply in case of damage. The reading into and out of the data translator is effected by simple synchronous mechanical devices. Therefore, the data translator described is well suited for inexpensive, medium speed data processing applications.

While the invention has been particularly shown and described with reference to preferred embodiments thereof, it will be understood by those skilled in the art that various changes in form and details may be made therein without departing from the spirit and scope of the invention.

I claim:

1. In a data processing machine of the type in which manifestations for identifying different data designations appear at respective ones of a sequence of times in a machine cycle, the translating device comprising: a branch circuit network including a plurality of exit terminals respectively pertaining, to different ones of said data designations, an input terminal, a plurality of circuit branches, and a plurality of switches for selectively connecting combinations of said circuit branches in series to establish a circuit path from said input terminal to any one of said exit terminals; transfer means adapted to be made effective at different ones of said sequence of times to operate one or more of said switches to connect said input terminal to a selected one of said exit terminals; operating means responsive to said data manifestations for making said transfer means effective; and means for applying an electric signal to said input terminal for translation to one of said exit terminals.

2. In a data processing machine of the type in which manifestations for identifying different data designations appear at respective ones of a sequence of times in a machine cycle, the translating device comprising: a branch circuit network, including a plurality of exit terminals respectively pertaining to different ones of said data designations, an input terminal, a plurality of circuit branches, and a plurality of switches for selectively connecting combinations of said circuit branches in series to establish a circuit path from said input terminal to any one of said exit terminals; transfer means operating synchronously with said sequence of times and adapted to be made effective at different ones of said sequence of times to operate one or more of said switches to connect said input terminal to a selected one of said exit terminals; operating means responsive to said data manifestations for rendering said transfer means effective; and means for applying an electric signal to said input terminal for selective translation to one of said exit terminals.

3. In a data processing machine of the type in which manifestations for identifying different data designations appear at respective ones of a sequence of times in a machine cycle, the translating device comprising: a branch circuit network, including a plurality of exit terminals respectively pertaining to different ones of said data designations, an input terminal, a plurality of circuit branches, and a plurality of switches for selectively connecting combinations of said circuit branches in series to esablish a circuit path from said input terminal to any one of said exit terminals; selectively operable switch transferring means, effective when operated to transfer one or more of said switches to connect said input terminal to a selected one of said exit terminals; moving means synchronous with said sequence of times adapted to be made effective to operate said switch transferring means; operating means responsive to said data manifestations for rendering said moving means effective to operate said switch transferring means; and means for applying an electric signal to said input terminal for translation to the one of said exit terminals selected by said switch moving means.

4. In a data processing machine of the type in which data manifestations for identifying different data designations appear at respective ones of a sequence of times in a machine cycle, the translating device comprising: a plurality of continuously rotating cams, combinations thereof corresponding to different data designations; a plurality of bails, each consistently responsive to a corresponding one of said cams; a circuit having a plurality of branches; switch contacts for directing electric pulses over different combinations of said circuit branches, the possible branch combinations each terminating in a contact representing one of said data designations; a plurality of switch contact actuators each operative to transfer at least one of said switch contacts, and each corresponding to a different one of said bails; interposing means responsive to said data manifestations for rendering said switch contact actuators responsive to said bails selectively; and electric signal generating means for applying electric signals to said circuitry for translation to different ones of said terminating contacts.

5. A machine having a plurality of data columns in each of which data designations are represented by at least one of a plurality of data manifestations, each of which appears at a respective one of a sequence of times recurring at regular intervals, comprising: a plurality of branched circuits, one for each of said columns, each having an entry terminal and a set of exit terminals; a group of transferring devices for each of said branched circuits, different combinations thereof in each group respectively corresponding to different ones of said data manifestations, and each selectively operable in the corresponding one of said branched circuits to connect said input terminal to different ones of said set of exit terminals; a plurality of means synchronous with said sequence of times, one for each of said columns, each responsive to said data manifestations in the respective column to selectively operate correct ones of said transferring devices in the respective one of said groups; a plurality of data receiving means, each connected to like exit terminals in all of said sets; and means for developing signals recurring more frequently than said sequence of times, after said sequence of times and in timed relation therewith, each of said signals being directed to the input terminal of a different one of said branched circuits for transfer to selected ones of said data receiving means.

6. A machine having a plurality of data columns in each of which data designations are represented by at least one of a plurality of data manifestations, each of which appears at a respective one of a sequence of times recurring at regular intervals, comprising: a plurality of branched circuits, one for each of said columns, each having an entry terminal, a set of exit terminals and a plurality of switches for selectively connecting combinations of said circuit branches in series to establish a circuit path from said input terminal to any one of said exit terminals; a group of switch transferring devices for each of said branched circuits, combinations of said devices corresponding to different ones of said data manifestations, each group selectively operable to transfer related switches in the corresponding one of said branched circuits; a plurality of data receiving means, each connected to like exit terminals of all of said sets; a plurality of camming means synchronous with said sequence of times, each of said camming means corresponding to like ones of said switch transferring devices in all of said groups; a plurality of interposing means, each responsive to data manifestations in a respective one of said columns to selectively connect the respective group of said transferring devices to said camming means for operating said switches in response thereto; and means for developing signals recurring more frequently than said sequence of times, at the end of said sequence of times and in timed relation therewith, each of said signals being directed to the input terminal of a different one of said branched circuits for transfer to selected ones of said data receiving means.

7. A printing machine of the matrix type, in which printed characters are formed by a plurality of dots suitably disposed on a record card, controlled by a record card having a plurality of index point positions of different data significance in sequence, the index point positions of like data significance being arranged in rows, comprising: means to feed said card at a uniform rate perpendicular to said rows; means to sense the data designations in said record card row by row in a sequence of times at regular intervals; a branch circuit network including a plurality of exit terminals respectively pertaining to different combinations of said rows, an input terminal, a plurality of circuit branches, and a plurality of switches for selectively connecting combinations of said circuit branches in series to establish a circuit path from said input terminal to any one of said exit terminals; transfer means adapted to be made effective at different ones of said sequence of times to operate one or more of said switches to connect said input terminal to a selected one of said exit terminals; operating means responsive to said sensing means for making said transfer means effective; means for applying an electric signal to said input terminal for translation to one of said exit terminals, a plurality of print elements arranged in a row perpendicular to the path of card motion; an impelling means for each of said elements, each of said impelling means including an electrostatic clutch operable to drive the corresponding one of said elements into impact with said record card; a buffer storage means arranged to present data in the form of a plurality of bits; means responsive to said exit terminals for entering sets of data bits into said buffer storage means, each of said sets corresponding to a printable character, each bit of a set being representative of a different one of the dots constituting the matrix, each of said sets being arranged in said buffer storage means in a plurality of rows, each row having one bit for each of said print elements; means for reading said rows of data bits out of buffer storage row by row; and means for operating said impelling means successively in response to each of said rows of data bits.

8. A printing machine of the matrix type, in which printed characters are formed by a plurality of dots suitably disposed on a record card, controlled by a record card having a plurality of data columns each of which is subdivided into index point positions of different data significance in sequence, the index point positions of like data significance being arranged in rows perpendicular to said columns; means to sense the data designations in each column of said record card row by row in a sequence of times at regular intervals; a plurality of branched circuits, one for each of said columns, each having an entry terminal and a set of exit terminals; a group of transferring devices for each of said branched circuits, different combinations thereof in each group corresponding to different combinations of said rows, and the transferring devices of each group being selectively operable to connect said input terminals to different ones of said set of exit terminals in the corresponding one of said branched circuits; a plurality of data receiving means, each connected to like ones of said exit terminals in all of said sets; means synchronous with said sequence of times for responding to said data designations to selectively operate correct ones of said transferring devices in any of said groups; means for developing signals recurring more frequently than the regular intervals of said sequence if times, after said sequence of times and in timed relation therewith, each of said signals being directed to the input terminal of a different one of said branched circuits for transfer to selected ones of said data receiving means; a plurality of print elements arranged in a row perpendicular to the path of card motion; an impelling means for each of said elements, each of said impelling means including an electrostatic clutch operable to drive the corresponding one of said elements into impact with said record card; a buffer storage means arranged to present data in the form of a plurality of bits; means responsive to said data receiving means for entering sets of data bits into said buffer storage means, each of said sets corresponding to a printable character, each bit of a set being representative of a different one of the dots constituting the matrix, each of said sets being arranged in said buffer storage means in a plurality of rows, each row having one bit for each of said print elements; means for reading said rows of data bits out of buffer storage row by row; and means for operating said impelling means successively in response to each of said rows of data bits.

No references cited.

UNITED STATES PATENT OFFICE
CERTIFICATION OF CORRECTION

Patent No. 2,969,730 January 31, 1961

Lyle W. Brehm

It is hereby certified that error appears in the above numbered patent requiring correction and that the said Letters Patent should read as corrected below.

Column 15, line 57, for "esablish" read -- establish --; column 18, line 20, for "if" read -- of --.

Signed and sealed this 27th day of June 1961.

(SEAL)
Attest:

ERNEST W. SWIDER
Attesting Officer

DAVID L. LADD
Commissioner of Patents